United States Patent [19]

Knemeyer

[11] 4,225,322

[45] Sep. 30, 1980

[54] COMPOSITE COMPACT COMPONENTS FABRICATED WITH HIGH TEMPERATURE BRAZING FILLER METAL AND METHOD FOR MAKING SAME

[75] Inventor: Friedel S. Knemeyer, Columbus, Ohio

[73] Assignee: General Electric Company, Worthington, Ohio

[21] Appl. No.: 868,357

[22] Filed: Jan. 10, 1978

[51] Int. Cl.² .............................................. E21B 9/36
[52] U.S. Cl. ...................................... 51/295; 51/309; 175/329; 175/375
[58] Field of Search .......................... 51/298, 309, 295; 175/330, 375, 329

[56] References Cited

U.S. PATENT DOCUMENTS

| | | | |
|---|---|---|---|
| 2,906,612 | 9/1959 | Anthony et al. | 51/309 |
| 3,461,983 | 8/1969 | Hudson et al. | 51/309 |
| 3,596,649 | 8/1971 | Olivieri | 51/309 |
| 3,745,623 | 7/1973 | Wentorf et al. | 51/309 |
| 3,757,879 | 9/1973 | Wilder | 175/329 |
| 3,767,371 | 10/1973 | Wentorf et al. | 51/307 |
| 3,913,280 | 10/1975 | Hall | 51/309 |
| 3,982,911 | 9/1976 | Lee | 51/309 |
| 4,006,788 | 2/1977 | Garner | 175/330 |
| 4,098,362 | 7/1978 | Bonnice | 175/329 |
| 4,109,737 | 8/1978 | Bovenkerk | 175/329 |

OTHER PUBLICATIONS

Brazing Manual, Am. Welding Society, 1963, p. 108.
High Frequency Heating Review, Lepel High Frequency Lab. Inc., vol. 1, No. 5.

*Primary Examiner*—Donald J. Arnold
*Attorney, Agent, or Firm*—Douglas B. Little; William S. Feiler; Dennis A. Dearing

[57] ABSTRACT

A component comprised of a composite compact, preferably diamond, and a substrate bonded to the compact. A preferred embodiment of the component is a cutter for a drill bit. The compact is comprised of a layer of bonded diamond or boron nitride particles and a base layer of cemented carbide bonded, preferably under high temperatures and pressures, to the particulate layer. The particulate layer is degradable by exposure to temperatures above a predetermined temperature. The substrate is bonded to the base layer of the compact with a filler metal which, to form a bond, requires the exposure of the surfaces to be bonded to a temperature substantially greater than the degradation temperature of the particulate layer. The component is fabricated by heating the base layer, filler metal and substrate to a temperature in excess of the degradation temperature while maintaining the temperature of the particulate layer below the degradation temperature via a heat sink.

7 Claims, 4 Drawing Figures

COMPOSITE COMPACT COMPONENTS FABRICATED WITH HIGH TEMPERATURE BRAZING FILLER METAL AND METHOD FOR MAKING SAME

CROSS REFERENCE TO RELATED APPLICATIONS

U.S. Pat. application Ser. No. 699,411; filed June 24, 1976, now U.S. Pat. No. 4,109,737 and assigned to the assignee of the invention herein is directed to a rotary drill bit comprising a plurality of cutting elements, each of which is comprised of an elongated pin with a thin layer of diamond bonded to the exposed end of the pin. The pin is mounted by press fitting into the drill crown.

U.S. Pat. No. 4,098,362 is directed to a rotary drill bit comprising a plurality of diamond compact cutters. The diamond compact cutters are mounted in a drill crown by molding or by attachment to a cemented carbide pin which is in turn mounted in a drill crown by pressed fitting. Brazing is also disclosed as an alternate technique for mounting such compact cutters in the drill crown.

U.S. Pat. No. 4,156,329 is directed to a method for fabricating a drill bit comprising a plurality of composite compact cutters by furnace brazing each cutter in a recess in the crown of the drill bit. In one embodiment each cutter is comprised solely of a composite compact with a layer of brazing filler metal coating the exposed surface of the substrate of the compact. In another embodiment each cutter is comprised of a composite compact bonded to one end of a cemented carbide pin, the other end of which is fixed in a recess of the drill bit crown.

BACKGROUND OF THE INVENTION

This invention relates to components comprised of abrasive compacts. Typical areas of application for such components are in wire dies, wear surfaces, rock cutting and drilling equipment and cutting tools for machining. The area of primary interest for this invention is in components useful as cutters for rock drilling bits and techniques for fabrications of such components.

A cluster compact is defined as a cluster of abrasive particles bonded together either (1) in a self-bonded relationship, (2) a means of a bonding medium disposed between the crystals, or (3) by means of some combination of (1) and (2). Reference can be made to U.S. Pat. No. 3,136,614, U.S. Pat. No. 3,233,988 and U.S. Pat. No. 3,690,818 for a detailed disclosure of certain types of compacts and methods for making same. (The disclosures of these patents are hereby incorporated by reference herein.)

A composite compact is defined as a cluster compact bonded to a substrate material such as cemented tungsten carbide. A bond to the substrate can be formed either during or subsequent to the formation of the cluster compact. Reference can be made to U.S. Pat. Nos. 3,743,489, 3,745,623 and 3,767,371 for a detailed disclosure of certain types of composite compacts and methods for making same. (The disclosure of these patents are hereby incorporated by reference herein.)

Brazing is defined as a group of welding processes wherein coalescense is produced by heating to suitable temperatures above 800° F. and by using a brazing filler metal having a melting point below that of the base metals. The filler metal is distributed between the closely fitted surfaces of the joint by capillary action.

Filler metal is defined as brazing filler metals and other metals or alloys used in bonding techniques such as diffusion bonding, hot pressing, resistance welding and the like. The filler may be either added as an additional component to the metal parts being bonded or formed from the metals of the parts themselves (e.g., fusion welding as defined in Van Nostrand's Scientific Encyclopedia, Fifth Edition (1976) pp 2330-2331).

A brazing filler metal is defined as a metal or alloy to be added when making a braze and having melting temperature above 800° F. (but below those of the metals being joined).

Conventional rotary drill bits for oil and gas well drilling and core drilling have heretofore used cutting elements such as (1) steel teeth, (2) steel teeth laminated with tungsten carbide, (3) an insert of cemented tungsten carbide, and (4) natural diamonds, all of which are set or molded in a tungsten carbide crown or cone. Due to the relatively short life and/or high operating cost of these conventional designs, it has recently been proposed to use synthetic diamond composite compacts as the cutting element in such drills.

In adapting composite compacts to certain drill bit applications, it has been found to be desirable to provide an elongated base or support for the composite compact to aid in attachment in the drill crown. While it is technically feasible to form an integral composite compact of an adequate length directly under high temperature and pressure, as disclosed in application Ser. No. 699,411 cross referenced above, this has not as yet been adopted commercially because of the significantly increased cost of manufacture. This becomes clear when realizing that the capacity of the reaction cell in which the compacts are made, under high temperatures and pressures, is limited. Thus, if compacts were produced as suggested in application Ser. No. 699,411, the number of compacts produced per cell would be reduced by about one-half potentially making the cost prohibitive.

One approach to avoiding this added cost is to braze an additional length of cemented carbide to the carbide base of the composite compact as disclosed in application Ser. Nos. 746,044 and 796,635 cross referenced above.

In field tests of these latter two designs, one problem which has been encountered is that the stresses on each cutting element are severe and some disattachment of the cutters has been encountered. The stresses are caused because the structure of most rocks is heterogeneous and thus have layers of varying hardness. These layers cause large variations in the impact loads applied to the cutting elements during drilling, and the bond strength of such designs is not always strong enough to withstand this.

In these designs, available attachment techniques and acceptable brazing filler metals for use with a diamond composite compact made in accordance with the teaching of U.S. Pat. No. 3,745,623 were limited because the diamond layer of such compacts is thermally degraded at temperatures above approximately 700° C. Similarly, it has been found that a cubic boron nitride (CBN) composite compact made in accordance with the teaching of U.S. Pat. No. 3,743,489 is also thermally degraded at temperatures above approximately 700° C. Because of the thermal degradation problem, it has been necessary to use brazing filler metals with a liquidus below 700° C. Such metals form brazing joints generally of lower strength than braze filler metals having a higher liquidus. Even when the lower temperature liquidus metals (such as BAg-1-ASW-ASTM classification) are used, temperatures approaching those at which the diamond layer is degraded are required; hence, great care is required to prevent degradation of the compact during brazing.

Accordingly, it is an object of this invention to provide improved and stronger components comprised of composite compacts.

Another object of this invention is to provide an improved cutter component for drill bits.

Another object of this invention is to provide an improved fabrication technique for forming high strength bonds to composite compacts without degrading the particulate layer of the composite compact.

Another object of this invention is to provide an improved fabrication technique for forming a high strength bond between a composite compact and cemented carbide pin in the fabrication of cutters for drill bits.

Another object of this invention is to provide improved techniques whereby small composite compacts produced by an expensive high temperature, high pressure process can be dimensionally scaled up to larger sizes permitting easier attachment of the compact to a tool body.

SUMMARY OF THE INVENTION

These and other objects of the invention are accomplished by a component comprised of a composite compact bonded to a substrate with a high temperature filler metal which, to form a bond, requires the exposure of the surfaces to be bonded to a temperature substantially greater than the degradation temperature of a particulate layer of the compact and a method for fabrication thereof. The method comprises the steps of (1) disposing the composite compact in thermal contact with a heat sink, (2) disposing the compact adjacent to a substrate with a high temperature filler metal disposed therebetween, and (3) heating the base layer of the compact, filler metal and substrate to a temperature in excess of the degradation temperature to form a high strength bond while maintaining the temperature of the particulate layer of the compact below the degradation temperature thereof.

DESCRIPTION OF THE PREFERRED EMBODIMENTS

Figure 1:
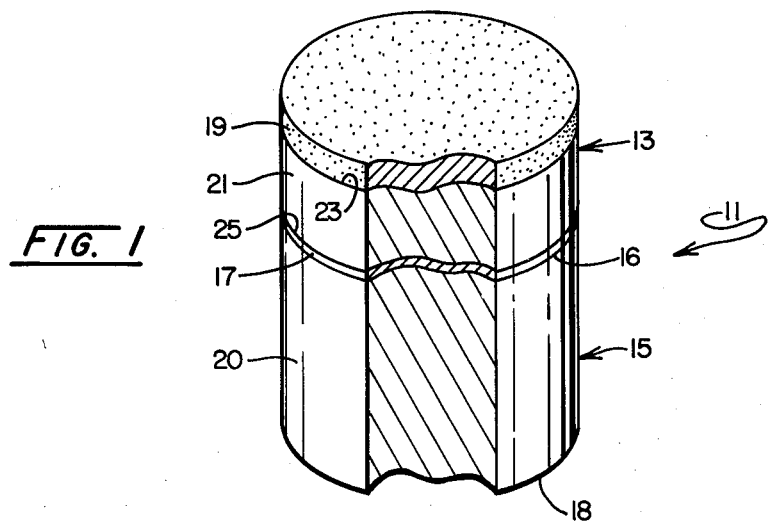
FIG. 1 is a fragmentary perspective view of a component in accordance with the features of this invention.

FIG. 1 shows a component 11 in accordance with one embodiment of the invention. Component 11 is comprised of (a) a composite compact 13, (b) a pin or substrate 15, and (c) a thin, continuous layer 17 of filler metal (shown disproportionately large for purposes of illustration) disposed between and bonding substrate 15 to compact 13 along an interface 16. The component configuration may, of course, be widely varied to suit the particular application.

Composite compact 13 is comprised of a particulate mass or layer 19 of bonded abrasive particles of either diamond or hard phase boron nitride and a mass or base layer 21 of cemented carbide bonded to compact 13 along an interface 23. Carbide mass 21 is also provided with an exposed surface 25 remotely spaced from interface 23.

In a preferred embodiment of compact 13, as explained in detail in U.S. Pat. No. 3,745,623, layer 19 is comprised by volume of at least 70% diamond and preferably in excess of 90% diamond. The remaining 30% or less is primarily comprised of the bonding material, preferably cobalt (or alloys), of the cemented carbide mass 21 which is infiltrated into layer 19 during the high temperature, high pressure fabrication process.

In an alternative embodiment of compact 13, compact 13 may be comprised of a hard phase boron nitride layer 19 constructed in accordance with U.S. Pat. No. 3,743,489 or U.S. Pat. No. 3,767,371 (incorporated by reference herein). The hard phase boron nitride may be either of a cubic or hexagonal structure. The referenced patents disclose only the use of the cubic form, however, the hexagonal form may be substituted in whole or in part for the cubic form.

Substrate 15 is preferably comprised of cemented carbide preferably the same as carbide mass 21. See U.S. Pat. No. 3,745,623; col. 5, line 58 to col. 6, line 9, for a detailed description of acceptable types of cemented carbide. Cemented carbide is preferable, particularly in drill bit applications, because of its hardness and impact resistance. Alternatively, masses 15, 21 may be composed of a ceramic, such as alumina, elemental metal or an alloy depending upon the particular characteristics required by the application for which the component is to be used. Reference can be made to U.S. Pat. No. 3,982,911 for a detailed description of acceptable materials. This patent is hereby incorporated by reference herein.

Filler metal 17 is preferably a high temperature, high strength brazing filler metal having a liquidus greater than the degradation temperature of particulate mass 19. As stated above in the case of a diamond and boron nitride composite compact made in accordance with U.S. Pat. No. 3,743,489 and U.S. Pat. No. 3,745,623 respectively, the degradation temperature is about 700° C. Acceptable filler metals may be selected from the group of alloys compatible with the materials being brazed. The ability to use such high strength brazing filler metals in accordance with this invention enables the formation of a strong bond between compact 13 and substrate 15. For example, bonds with a torsional shear strength of $6.5 \times 10^8$ to $3.4 \times 10^8$ n/m$^2$ measured over a temperature range of 25° C. to 350° C. respectively have been achieved by brazing with a braze alloy commercially identified as Anaconda 773 brazed at about 950° C. for a component as shown in FIG. 1. In this test, base 21 and pin 15 were Co cemented WC. This may be compared to torsional shear strength of $4.0 \times 10^8$ to $1.2 \times 10^8$ n/m$^2$ measured over a temperature range of 25° C. to 350° C. respectively, for a component as in FIG. 1 except that the bond consisted of brazing filler metal BAg-1 (ASW-ASTM classification) (which is a Ag alloy).

As defined above, filler metal 17 may be alternatively a metal or alloy used in bonding techniques such as diffusion bonding, hot pressing, resistance welding and the like.

Figure 2:
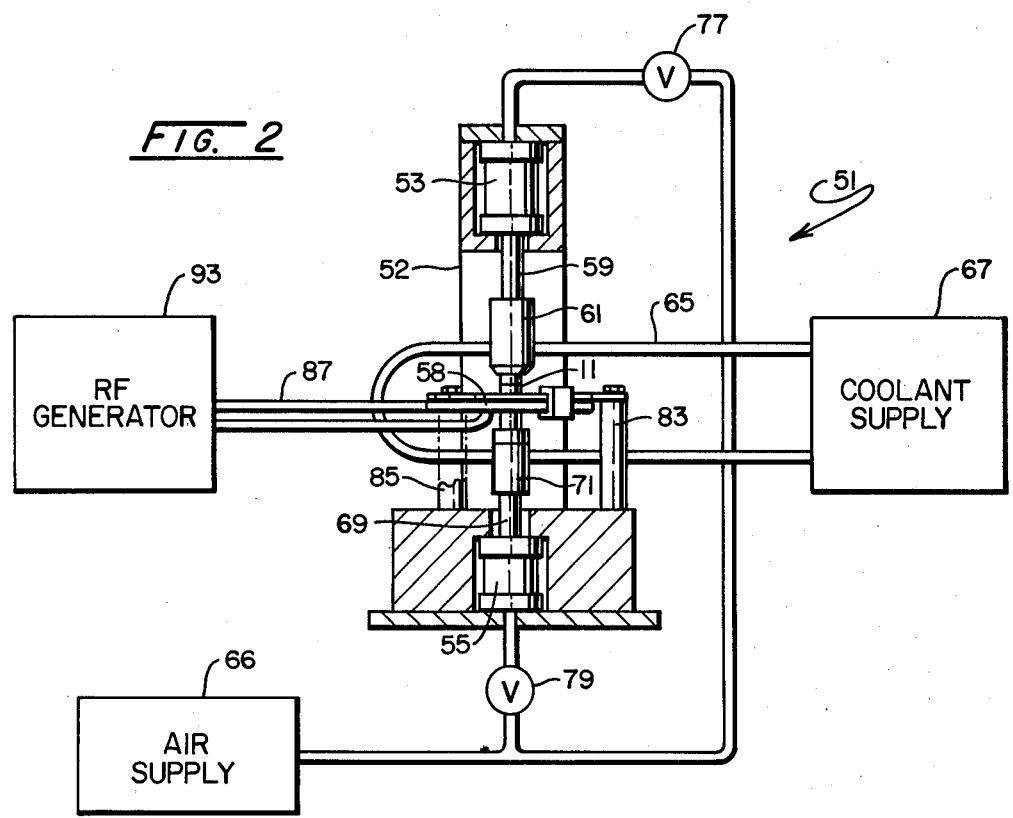
FIG. 2 is a schematic diagram of an apparatus for fabricating a component in accordance with the features of this invention.
Figure 3:
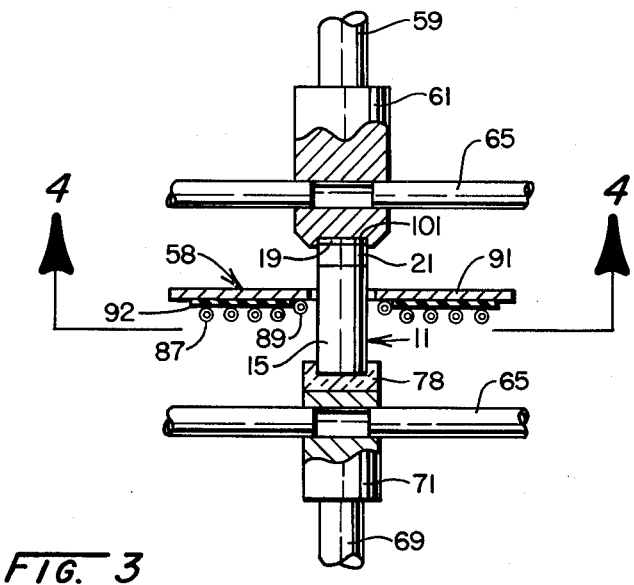
FIG. 3 is an enlarged plan view of a central portion of the apparatus shown in FIG. 2.
Figure 4:
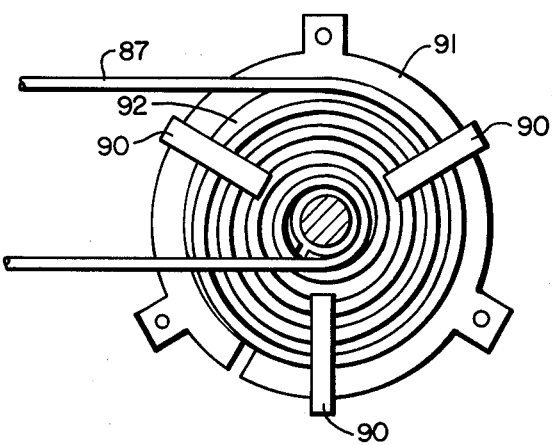
FIG. 4 is a view taken along line 4—4 of FIG. 3.

FIGS. 2–4 show an apparatus 51 for fabricating component 11 shown in FIG. 1 by brazing in accordance with a preferred embodiment of the method of this invention. Apparatus 51 (FIG. 2) is comprised of a frame member 52. Fixed to frame 52 are a pair of pneumatic cylinders 53, 55 for holding, relative to an induction coil assembly 58, a component 11 for brazing. The pneumatic cylinder 53 (FIGS. 2, 3) comprises a plunger 59 with a recessed head 61 for receiving one end of composite compact 13. Head 61 is provided with a coolant, preferably water, via tube 65 from a coolant supply 67 of a conventional construction. Head 61 and coolant supply 67 together function as a heat sink for diamond layer 19 during the brazing of compact 13 to substrate (pin) 15.

Pneumatic cylinder 55 is similarly comprised of a plunger 69 with a head 71 fixed at one end thereof. A cup-shaped ceramic insulator 78 is positioned on head 71 for supporting one end of a substrate preventing the heat sinking of pin 15 to head 71 during brazing. Head 71 is also interconnected to coolant supply 67 via tube 65.

Pneumatic cylinders 53, 55 (FIG. 2) are supplied air under pressure from air supply 66 through control valves 77, 79 respectively. When extended, (FIGS. 2, 3) plungers 59, 69 position component 11 coaxially of induction assembly coil 58 which is supported on frame 53 by supports 83, 85. (A third support for assembly 58 is not shown.)

FIG. 4 shows an enlarged plan view of assembly 58 taken along line 4—4 of FIG. 3. Coil assembly 58 is of a conventional and well-known construction and is available commercially from Lepel High Frequency Laboratory, Inc.; New York, N.Y. Coil assembly 58 is comprised of a coiled electrically conductive (Cu) tube 87 and a Cu plate 91. Plate 91 and coiled tube 87 are held together by a plurality of clamps 90. The intermost coil 89 of tube 87 is fixed and electrically connected to copper plate 91 and the remaining coils are electrically insulated from plate 91 via insulator 92. Tube 87 of induction coil 81 is interconnected to an RF generator 93 for energizing assembly 58. As is well known, assembly 58 when energized, generates a highly localized magnetic field in the region about the intersection of the plane of assembly 58 and the axis perpendicular to the plane and passing through the center of coiled tube 87. This field induces electric current in a conductive member disposed axially of assembly 58 and will directly provide only localized heating of support 15 in the region of the magnetic field generated by assembly 58.

It is preferred to position component 11 (unbrazed condition) with interface 17 located about 3 mm above the plane of assembly 58. This allows heat to spread conductively from the inductively heated area to interface 17.

It has been found surprisingly that high strength bonds may be formed to compact 13 in this manner without degradation of layer 19. The ability to elevate the interface 16 to a temperature far above the degradation temperature of layer 19 while maintaining layer 19 below its degradation temperature is believed to be due at least in part to the mismatched thermal conductivities of layer 19 and mass 21. For example, in a commercial embodiment constructed by the teaching of U.S. Pat. No. 3,745,623 layer 19 has a thermal conductivity approximating that of single crystal which is about 5.9 cal/(sec)(°C.)(cm) while the carbide layer has a thermal conductivity of about 0.25 cal/(sec)(°C.)(cm). This permits the interface to reach a much higher temperature than the layer 19 as heat may be conducted away rapidly from layer 19 by heat sinking in accordance with this invention.

A preferred embodiment of the method for practicing this invention with apparatus 51 is set forth below. A substrate 15 is placed in a ceramic cup 78 and together disposed on head 71. Head 71 is then actuated into its extended position via air valve 79. A conductive paste is applied to diamond layer 19 of composite compact 13 after which the composite compact is positioned in recess 101 of head 61. The paste bonds compact 13 to head 61 and provides a good thermally conductive path therebetween for heat sinking layer 19. A silver or other conventional paste material can be used to establish a good thermal path between layer 19 and head 61. Air valve 77 is then actuated to position compact 63 in firm engagement with substrate 75 with a quantity of filler metal 17 provided at the interface of compact 13 and pin 15. Engagement pressures between $2.1 \times 10^3$ n/m$^2$ and $8.3 \times 10^4$ n/m$^2$ are acceptable. RF generator 93 is then actuated for approximately 6 to 30 seconds to heat filler metal 17 to a molten condition and thereby firmly bond compact 13 to pin 15. The upper limit of time is not critical when layer 19 is properly cooled. Generator 93 is then deactivated. Following this, valves 77, 79 are deactivated to retract plungers 59, 69 to permit removal of the completed component 11.

A substrate 15 is preferably prepared for brazing by applying a thin layer of a brazing filler metal directly to one end thereof. The layer is then ground or polished to a thickness of 0.12 mm preferably. Alternatively, it will be recognized by those skilled in the art that a shim or powder mixture of brazing filler metal and flux may be positioned between composite compact 13 and substrate 15 as substrate 15 and compact 13 are positioned between plungers 59, 69.

Accordingly, while the invention has been shown and described in connection with certain preferred embodiments thereof, other embodiments and modifications will be apparent to those skilled in the art. For example, the preferred method of heat sinking layer 19 is by use of a water cooled head 61 of steel. However, other materials may be used for head 61 as well as other coolants or coolant techniques. Also techniques such as laser, electron beam, arc plasma, and resistance interface heating for localized heating of substrate 15 to the brazing temperature may be used. Still further, the ability to retain the particulate layer below its degradation temperature while exposing the surfaces to be bonded to temperatures exceeding the degradation temperature of the layer permits the use of other conventional high temperature bonding techniques such as diffusion bonding, hot pressing, resistance welding and the like in accordance with the features of this invention. It is intended that the appended claims cover all such embodiments and modifications as are within the true spirit and scope of this invention.

I claim:
1. An improved component of the type comprised of:
A. an abrasive composite compact made of a layer of bonded abrasive particles selected from the group consisting of diamond and cubic boron nitride bonded together, said layer being bonded to a base layer made of a material selected from the group consisting of cemented metal carbide selected from the group consisting of tungsten carbide, titanium carbide and tantalum carbide wherein the material providing the metal bond is selected from the group consisting of cobalt, nickel, iron and mixtures thereof; an elemental metal which forms a stable nitride or boride; and a metal alloy which forms a stable nitride or boride;

B. which composite compact is bonded to a substrate made of a material selected from the same group used for the base layer;

C. by a layer of brazing filler metal disposed between said abrasive compact and said substrate; wherein, the improvement comprises those components in which the brazing filler metal has a liquidus substantially above 700° C. and the thermal degradation temperature of the layer of bonded abrasive particles.

2. The improved component of claim 1 wherein both the base layer and the substrate are made of a metal bonded carbide selected from the group consisting of tungsten carbide, titanium carbide and tantalum carbide wherein the metal providing the metal bond is selected from the group consisting of cobalt, nickel, iron and mixtures thereof.

3. The improved component of claim 2 wherein the abrasive particles are made from diamond, and wherein the base layer and substrate are both made from the same type of cemented carbide.

4. In a method for fabricating a component comprised of:

A. an abrasive composite compact made of a layer of bonded abrasive particles selected from the group consisting of diamond and cubic boron nitride bonded together, said layer being bonded to a base layer made of a material selected from the group consisting of cemented metal carbide selected from the group consisting of tungsten carbide, titanium carbide and tantalum carbide wherein the material providing the metal bond is selected from the group consisting of cobalt, nickel, iron and mixtures thereof; an elemental metal which forms a stable nitride or boride; and a metal alloy which forms a stable nitride or boride;

B. bonded to a substrate made of a material selected from the same group used for the base layer;

C. by a layer of brazing filler metal which method comprises brazing said abrasive compact to said substrate using a brazing filler metal the improvement which comprises:

(i) using a brazing filler metal having a liquidus substantially greater than 700° C. and the thermal degradation temperature of the abrasive; and (ii) disposing the abrasive composite compact in thermal contact with a heat sink during the brazing operation.

5. The improved method as recited in claim 4 wherein both the base layer and the substrate are made from a metal bonded carbide selected from the group consisting of tungsten carbide, titanium carbide and tantalum carbide wherein the metal providing the metal bond is selected from the group consisting of cobalt, nickel, iron and mixtures thereof.

6. The improved method as recited in claim 5 wherein the brazing temperature is about 950° C.

7. The improved method of claim 4 which further comprises the step of providing a coating of a high thermally conductive material between said layer of bonded abrasive particles and said heat sink to establish a highly thermally conductive path therebetween and wherein in step (ii) the layer of bonded abrasive particles is disposed in a recess in said heat sink.

* * * * *

UNITED STATES PATENT AND TRADEMARK OFFICE
CERTIFICATE OF CORRECTION

PATENT NO. : 4,225,322
DATED : September 30, 1980
INVENTOR(S) : Friedel S. Knemeyer It is certified that error appears in the above-identified patent and that said Letters Patent are hereby corrected as shown below:

Column 1, Line 48, please replace the word "a" which appears immediately after (2) with the word —by—.

Column 1, Line 51, please correct U. S. Pat. No. "3,136,614" to —3,136,615—.

Column 1, Line 52, please correct Patent No. "3,690,818" to —3,609,818—.

Column 5, Line 28, please change the number "53" to — 52 —.

Column 6, Line 17, please change number "63" to — 13 —.

Column 6, Line 18, please change number "75" to — 15 —.

Signed and Sealed this

Third Day of August 1982

[SEAL]

Attest:

GERALD J. MOSSINGHOFF

Attesting Officer   Commissioner of Patents and Trademarks